(12) United States Patent
Sawey et al.

(10) Patent No.: US 8,737,459 B2
(45) Date of Patent: May 27, 2014

(54) TRANSMITTER EQUALIZER OPTIMIZATION

(75) Inventors: David Christopher Sawey, Richardson, TX (US); Jian Chang, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 352 days.

(21) Appl. No.: 13/178,500

(22) Filed: Jul. 8, 2011

(65) Prior Publication Data

US 2013/0010854 A1 Jan. 10, 2013

(51) Int. Cl.
*H04W 24/00* (2009.01)

(52) U.S. Cl.
USPC ............... 375/231; 375/232; 375/233

(58) Field of Classification Search
USPC ............ 375/231, 233, 232, 219, 229, 230; 370/290, 912
See application file for complete search history.

(56) References Cited

U.S. PATENT DOCUMENTS

| | | | |
|---|---|---|---|
| 6,697,423 B1 * | 2/2004 | Jin et al. | 375/233 |
| 2010/0128763 A1 * | 5/2010 | Morita et al. | 375/219 |
| 2010/0329309 A1 * | 12/2010 | Tsui et al. | 375/130 |

* cited by examiner

*Primary Examiner* — Shuwang Liu
*Assistant Examiner* — Helene Tayong
(74) *Attorney, Agent, or Firm* — John R. Pessetto; Wade J. Brady, III; Frederick J. Telecky, Jr.

(57) ABSTRACT

A transmitter includes an equalizer for conditioning a data signal in response to a first and a second equalizer setting. The first and second equalizer settings are both associated with a selected point on a two-dimensional search grid. The search grid includes a first equalizer setting and a second equalizer setting for each point on the search grid. The transmitter transmits a data signal across a first channel medium using settings associated with a selected point on the search grid. A receiver analyzes the received signal from the transmitter to determine a signal quality metric. The search grid is used to select settings from neighboring points to produce signals that are evaluated to produce signal quality metrics. The results of the evaluations are used to efficiently search the search grid for optimum equalizer settings for the transmitter.

10 Claims, 4 Drawing Sheets

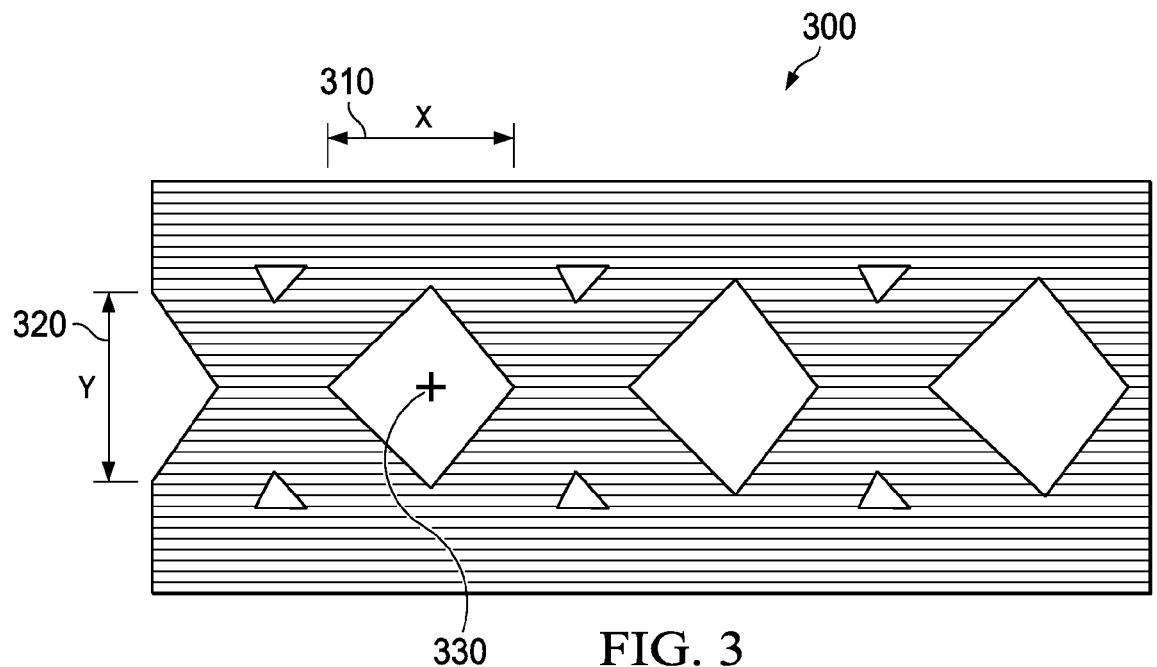
FIG. 3
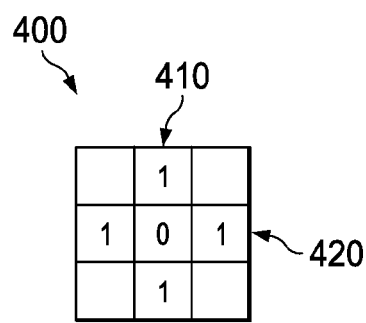
FIG. 4
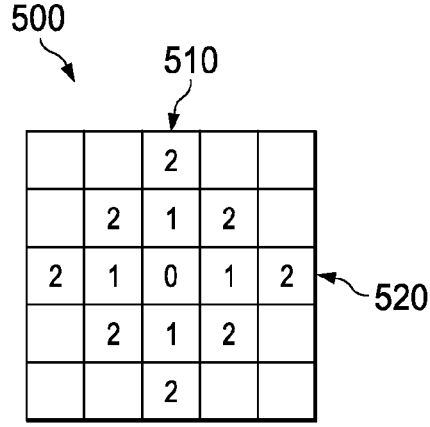
FIG. 5
FIG. 6

TRANSMITTER EQUALIZER OPTIMIZATION

BACKGROUND

Electronic devices communicate using links having electrical (including electro-optical) components. As processing speeds of the electronic devices increase, the speed of communication between such devices also increase. As the speed of communications across various media increases, characteristics that effectively limit the speed of transmission of signals become harder to physically control. Signal processing techniques are used to condition output signals and recognize input signals to compensate for the limiting physical parameters. However, advances in such techniques normally require additional space or power consumption to implement, which increases cost and limits applications having heat or power budgets.

The problems noted above are solved in large part by a system that efficiently searches for settings to condition signals to compensate for the limiting physical characteristics. The system includes an equalizer for conditioning a data signal in response to a first and a second equalizer setting. The first and second equalizer settings are both associated with a selected point on a two-dimensional search grid. The search grid includes a first equalizer setting and a second equalizer setting for each point on the search grid. A transmitter transmits an equalized data signal across a first channel medium using equalizer settings associated with a selected point on the search grid. A receiver analyzes the received signal from the transmitter to determine a signal quality metric. The search grid is used to select settings from neighboring points to produce signals that are evaluated to produce signal quality metrics. The results of the evaluations are used to efficiently search the search grid for optimum equalizer settings for the transmitter.

BRIEF DESCRIPTION OF THE DRAWINGS

FIG. 3 is a signal diagram illustrating an eye margin signal quality metric in accordance with the present disclosure.

FIG. 4 is a tabular diagram illustrating an initial search grid in accordance with embodiments of the present disclosure.

FIG. 5 is a tabular diagram illustrating an expanded search grid in accordance with embodiments of the present disclosure.

FIG. 6 is a tabular diagram illustrating a re-centered search grid in accordance with embodiments of the present disclosure.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ". Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
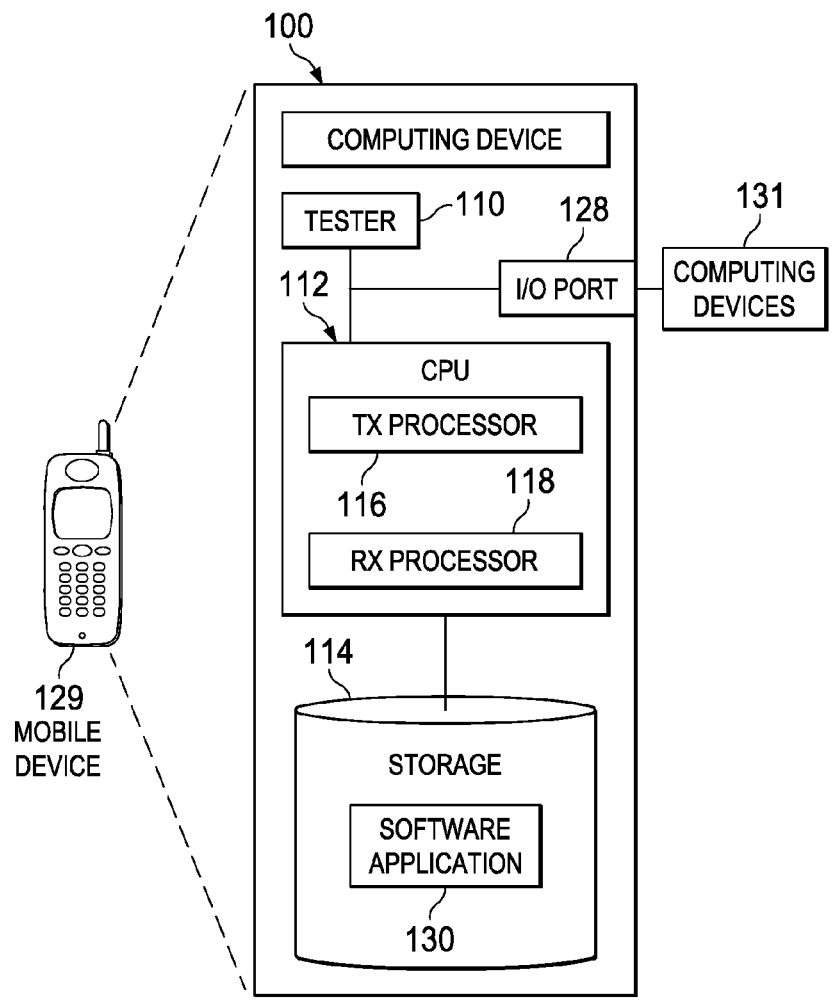
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as RAM, flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or more transmitter (TX) processor 116 and receiver (RX) processor 118, which are used transmit and receive data either locally (for example, between electronic devices within computing device 100) or externally (for example, with computing devices 131, which might not be closely connected to the computing device 100).

Often, transmit/receive pairs are implemented in a SERDES (serializer/deserializer) configuration for communication across a channel. Symbols are used to convey data, and channel characteristics impede the rate at which the symbols can be conveyed by causing inter-symbol interference (ISI). ISI can be minimized in transmission, for example, by using pre-cursor emphasis and post-cursor emphasis to compensate for characteristics of the channel used for the transmission.

Disclosed herein are techniques for efficiently selecting settings for configuring and/or tuning a transmitter to match the transmission channel characteristics. For example, the transmitter includes configurable settings for a transmit FIR (finite impulse response) filter (used for pre-cursor emphasis and post-cursor emphasis). The filter coefficients for the FIR are used initially to tune the transmitted signal to provide an estimated optimum performance for a channel that has characteristics that are not known. The settings for optimum performance are tested by using different transmitter settings selected using a search grid and observing the resulting signal quality at the receiver. The receiver sends an indication of which parameters provide an optimized performance back to the transmitter by using a "back channel" for transmitting from the receiver to the transmitter. Configuration can be a "set and forget" operation and/or a tuning operation that includes repeatedly selecting the settings and reconfiguring the transmitter to match changing conditions.

Figure 2:
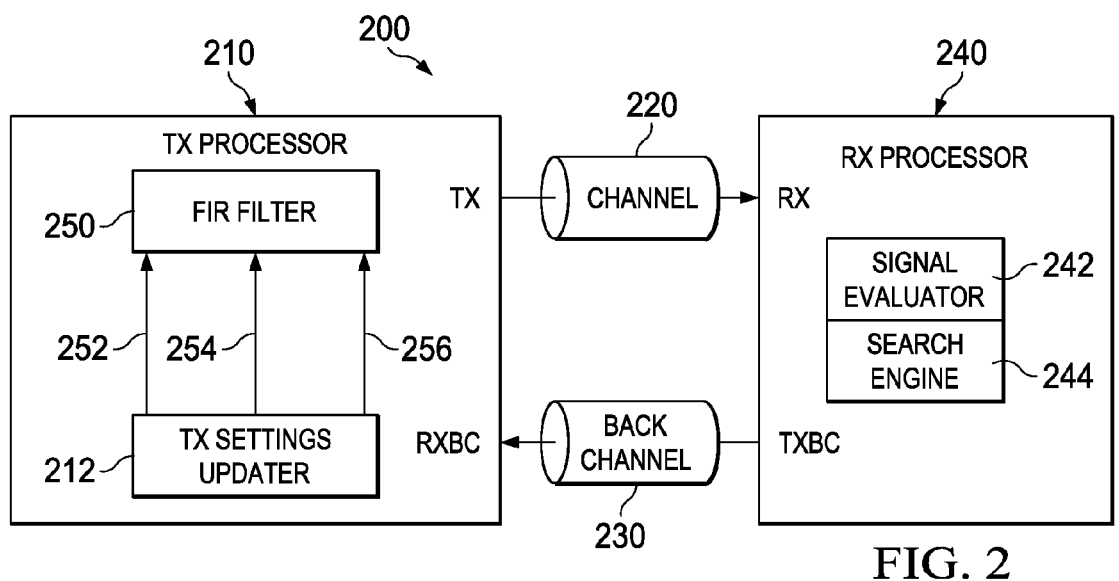
FIG. 2 is a block diagram illustrating a computing system including a transmitter equalizer unit in accordance with embodiments of the disclosure.

FIG. 2 is a block diagram illustrating a computing system including a transmitter equalizer unit in accordance with embodiments of the disclosure. Transmitter processor 210 is an embodiment of transmitter processor 116 and includes a transmitter settings updater 212 and a FIR (finite impulse response) filter 250. Initially, settings for the FIR filter 250 are selected, for example, by estimating settings that are applicable for a generic communications channel or for a communications channel that is commonly encountered for a group of applications. The estimated settings are associated with an initial point on a search grid (discussed below), which allows a search algorithm (for example) to quickly find an optimum performance relatively quickly.

Transmitter processor 210 transmits data from port TX across channel 220 where it is received by port RX of receiver processor 240. Signal evaluator 242 determines a signal quality metric for the received data by, for example, measuring an eye margin of an electronic representation of the received data signal. Search engine 244 applies an iterative or recursive search algorithm as disclosed below to determine optimized settings to be used to equalize transmit data to be transmitted across channel 220. The processing power used is minimized by using a search algorithm that is readily implemented in hardware and by avoiding an exhaustive search for optimum solutions. When the channel type is known in advance, the search engine 244 can readily and quickly find an optimum solution because potential settings that are close to the initial point of search are more likely to be optimal than points far away from the initial point of search.

Receiver processor 240 transmits an indication of the optimum solution from port TXBC (transmitter back channel) across back channel 230 where it is received by port RXBC (receiver back channel) of transmitter processor 210. Thus, the back channel is used to convey an indication of the selected first equalizer setting and the second equalizer setting to the equalizer used to equalize the transmitted signal. (Back channel 230 need not be of the same type or speed as channel 220.) Transmitter settings updater 212 uses the received indication of the optimum solution to update coefficients of the FIR filter 250. For example, the coefficients of the FIR filter 250 are updated by using one or more of the pre-cursor tap 252, the cursor tap 254, and the post-cursor tap 256. In an embodiment, the pre-cursor coefficients and post-cursor coefficients are associated with each point of a search grid; thus, the coordinate of a point on the search grid can be used to reference the coefficients associated with the addressed point. The FIR filter 250 is then used to equalize a data signal having an emphasis that is tailored for overcoming actual effects of channel 220.

In various embodiments, the search engine 244 (or portions thereof) can be included in the transmitter processor 210. The transmitter processor 210 can receive indications of the results of the evaluations of received signals by signal evaluator 242, wherein the evaluations are transmitted across the back channel 230 to the transmitter processor 210. In response, the search engine 244 works in conjunction with the transmitter setting update 212 to program the FIR filter 250 to equalize the data signal to be transmitted by the transmitter processor 210. The operation of the FIR filter 250 is discussed below with respect to FIG. 8. The effects of the taps associated with the FIR filter 250 are discussed below with respect to FIG. 9.

FIG. 3 is a signal diagram illustrating an eye margin signal quality metric in accordance with the present disclosure. Diagram 300 vertically represents amplitude (e.g., in millivolts) of a data signal and horizontally represents time (e.g., in user increments). Diagram 300 is an electronic representation of the received data signal and depicts an "eye" centered at location 330, and having an eye margin having a width 310 and a height 320.

Generally, an increase in the eye margin along either direction or both directions corresponds with a higher quality of signal propagation. The eye margin can be controlled, for example, by adjusting the pre-cursor tap (which primarily controls the height of the transmitter waveform prior to a signal transition) and the post-cursor tap (which primarily controls the height of the transmitter waveform following a signal transition) of the FIR filter 250. Since the received eye is affected by changes in the transmitter waveform, the height 320 and width 310 of the eye margin can be maximized by adjusting the settings for the pre-cursor tap and the post-cursor tap.

As disclosed herein, the transmitter settings are represented as a two dimensional search grid. The disclosed search engine 244 is arranged to search the search grid in an efficient manner. The first set of coefficients associated with the search grid can be addressed along a first dimension and have settings that generally increase from a minimum value to higher values as the search grid is traversed in the first dimension. The second set of coefficients associated with the search grid can be addressed along a second dimension and have settings that progressively increase from a minimum value as the search grid is traversed in the second dimension. Thus, the coordinates of a point on the search grid are used to select a first and second setting that are used to adjust the width 310 and the height 320 of the eye centered about location 330.

The search grid defines an operating space of potential values of the pre-cursor and post-cursor taps. Each of the coordinates of a point on the search grid potentially provides an optimum performance for compensating for the limiting physical characteristics of a channel medium. Thus, a point on the search grid is predictive of a transfer function of the channel medium.

In an embodiment, the values of the pre-cursor settings in the second dimension do not necessarily increase or remain constant, but can vary to permit optimized tuning for a particular pre-cursor and post-cursor pair of settings. Likewise, the values of the post-cursor settings in the first dimension do not necessarily increase or remain constant, but can vary to permit optimized tuning for a particular pre-cursor and post-cursor pair of settings.

The search grid is traversed by search engine 244 by evaluating a received signal that was generated by the FIR filter 250 using pre-cursor and post-cursor values associated with an initial point, determining a signal quality metric, and then saving the signal quality metric at that point. In accordance with various embodiments discussed below, adjacent points (e.g., horizontally and vertically next to the initial point) in the search grid are used to select values for programming the pre-cursor and post-cursor taps, and a signal quality metric is determined for each data signal that was transmitted using pre-cursor and post-cursor values associated with each of the adjacent points (thus extending the search from an initial point to adjacent points, as discussed below with reference to FIG. 4).

FIG. 4 is a tabular diagram illustrating an initial search grid in accordance with embodiments of the present disclosure. The initial point of search is designated as having a value (for distance from the initial point) of zero. A two-dimension coordinate system, such as an "(x,y)" system, is used to represent a point on the search grid, where each point is associated with a first and a second FIR filter coefficient. A coordinate of (0,0) is selected as an initial or default coefficient setting. (The designation of (0,0) as an initial point is chosen for simplicity of calculations and instead can be assigned to any point on a search grid.) The distance "dist" from an arbitrary setting point (x,y) to the initial point is defined as:

$$dist = |x| + |y| \quad (1)$$

Thus, four "nearest neighbor" points (being horizontally or vertically adjacent) are designated as having value of one (for distance from the initial point). In an embodiment, pre-cursor values in column 410 containing the initial point are associated with the same (or similar) pre-cursor tap values, while post-cursor values in the row 420 containing the initial point are associated with the same (or similar) post-cursor tap values.

Each of the nearest neighbor points (e.g., having a distance of one to the initial point) in the search grid are used to select values for programming the pre-cursor and post-cursor taps. Each nearest neighbor point is evaluated in turn by programming the FIR filter 250 with the associated values for the pre-cursor and post-cursor taps and determining a signal quality metric for each data signal produced using tap values associated with each of the adjacent points.

The signal quality metric produced for each of the adjacent points is compared with the signal quality metric produced for the initial point. If the signal quality metric produced for one or more of the adjacent points is better than the signal quality metric produced for the initial point, the set of tap values that produced the best point signal quality metric are selected for loading into the FIR filter 250 for providing emphasis for the data signal. (In this case, the search for better values can optionally be presently continued or initiated at a later time using the selected tap values as the new initial point as described below with reference to FIG. 6.) If the signal quality metric produced for each of the adjacent points is the same (and/or no better) than the signal quality metric produced for the initial point, the distance on the search grid can be increased and more remote points evaluated as discussed below with reference to FIG. 5.

FIG. 5 is a tabular diagram illustrating an expanded search grid in accordance with embodiments of the present disclosure. The initial point of search is designated as having a value (for distance from the initial point) of zero. The four "nearest neighbor" points (being horizontally or vertically adjacent) are designated as having value of one (for distance from the initial point). Further, there are eight (four times the distance of two) "nearest neighbor once-removed" points having a distance of two (e.g., for distances from the initial point by counting points traversed in a vertical and/or horizontal direction). In an embodiment, pre-cursor values in columns 510 (designated generally) are associated with the same (or similar) pre-cursor tap values, and post-cursor values in the rows 520 (designated generally) associated with the same (or similar) post-cursor tap values).

The signal quality metric produced for each of the eight adjacent points having a distance of two is compared with the signal quality metric produced for the initial point. If the signal quality metric produced for one or more of the remote points having a distance of two is better than the signal quality metric produced for the initial point (and the neighboring points having a distance of one), the set of tap values that produced the best point signal quality metric are selected for loading into the FIR filter 250 for providing emphasis for the data signal. If the signal quality metric produced for each of the adjacent points is the same (and/or no better) than the signal quality metric produced for the initial point, the distance on the search grid can be increased (to a value of three, for example, and twelve (four times the distance of three) more remote points evaluated.

FIG. 6 is a tabular diagram illustrating a re-centered search grid in accordance with embodiments of the present disclosure. Point "P" represents the previous origin, point "0" represents the new origin, points "X" represent points already sampled (but in which no improvement was found), and points "1" represent sample points that are distance 1 from the new point of origin "P." The three points labeled "1" are the nearest neighbor points in the search grid that have not yet (and/or recently) been evaluated are used to select values for programming the pre-cursor and post-cursor taps. Each point is evaluated in turn by programming the FIR filter 250 with the associated values for the pre-cursor and post-cursor taps to determine a signal quality metric for each data signal produced using tap values associated with each of the adjacent points. Thus, the signal quality metric for three points (as compared to four in the initial grid search) are determined for points "1" are taken.

Figure 7:
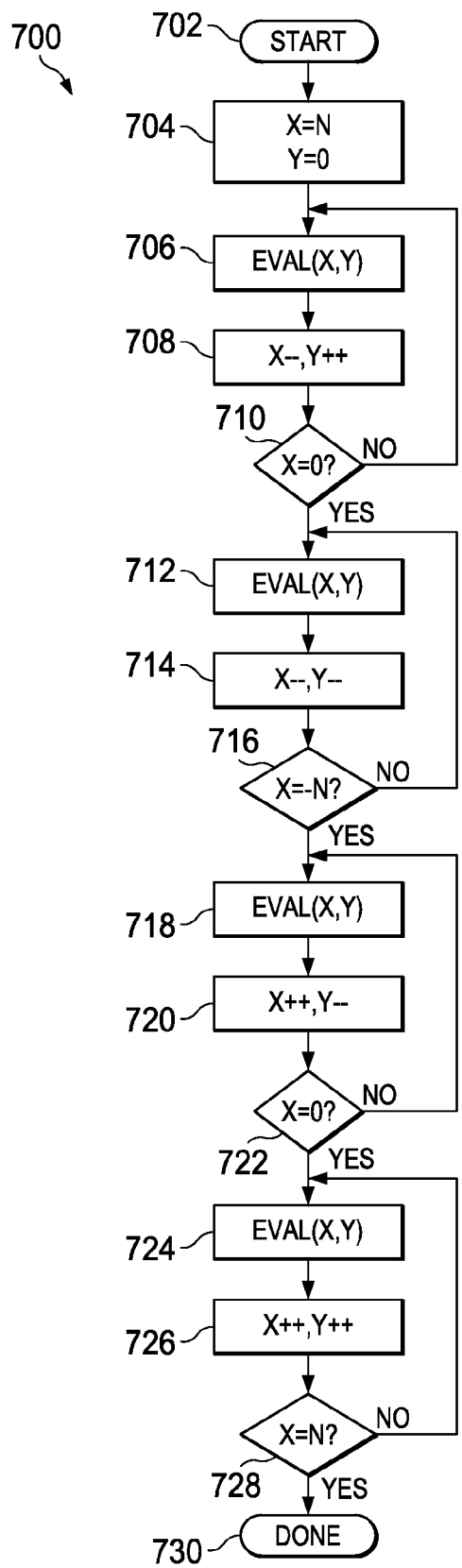
FIG. 7 is a process diagram illustrating a method for searching an operating space of potential values of the precursor and post-cursor taps in accordance with embodiments of the present disclosure.

FIG. 7 is a process diagram illustrating a method for searching an operating space of potential values of the pre-cursor and post-cursor taps in accordance with embodiments of the present disclosure. The operating space is partitioned using a grid having an initial point that is located at coordinate (0,0) in the search grid. Each of the point of the search grid has an associated pre-cursor and post-cursor tap value. As discussed above, pre-cursor values in columns are associated with the same (or similar) pre-cursor tap values, and post-cursor values in the rows are associated with the same (or similar) post-cursor tap values. The initial point is evaluated and stored. For example, the point is evaluated by programming the FIR filter 250 with the associated values for the pre-cursor and post-cursor taps and determining a signal quality metric the data signal produced using tap values associated with the initial point.

Process 700 is entered at node 702 and proceeds to function 704. At function 704, pre-cursor values are initialized, where "N" is the distance (e.g., in number of points traversed horizontally and/or vertically) from the initial (e.g., center) point. The variable "x" is used to control movement of the search method in the horizontal direction in the search grid, and the variable "y" is used to control movement of the search method in the vertical direction in the search grid. Thus, an initial search point of variable "y" of zero, and variable "x" selected a maximum distance "N" from the center point is selected.

In function 706, the point designated by variable "x" and the variable "y" is evaluated and stored. For example, the point is evaluated by programming the FIR filter 250 with the associated values for the pre-cursor and post-cursor taps and determining a signal quality metric the data signal produced using tap values associated with the selected point.

In function 708, the value of variable "x" is decremented and the value of variable "y" is incremented (thus urging the search function to select adjacent points in a generally counter-clockwise direction). In function 710, the value of variable "x" is compared with zero. If the value of variable "x" is zero, processing proceeds to function 712 where a point in another (e.g., second) quadrant is evaluated. If the value of variable "x" is not zero, processing resumes at function 706 to evaluate another point in the same (e.g., first) quadrant of the search grid.

In function 712, the next point designated by variable "x" and the variable "y" is evaluated and stored. For example, the point is evaluated by programming the FIR filter 250 with the associated values for the pre-cursor and post-cursor taps and determining a signal quality metric the data signal produced using tap values associated with the selected point.

In function 714, the value of variable "x" is decremented and the value of variable "y" is decremented (thus continuing to urge the search function to select adjacent points in a generally counter-clockwise direction). In function 716, the value of variable "x" is compared with the inverse of variable "N." If the value of variable "x" is equal to the inverse of variable "N," processing proceeds to function 718 where a point in another (e.g., third) quadrant is evaluated. If the value of variable "x" is not equal to the inverse of variable "N," processing resumes at function 712 to evaluate another point in the same (e.g., second) quadrant of the search grid.

In function 718, the next point designated by variable "x" and the variable "y" is evaluated and stored. For example, the point is evaluated by programming the FIR filter 250 with the associated values for the pre-cursor and post-cursor taps and determining a signal quality metric the data signal produced using tap values associated with the selected point.

In function 720, the value of variable "x" is incremented and the value of variable "y" is decremented (thus continuing to urge the search function to select adjacent points in a generally counter-clockwise direction). In function 722, the value of variable "x" is compared with zero. If the value of variable "x" is equal to zero, processing proceeds to function 724 where a point in another (e.g., fourth) quadrant is evaluated. If the value of variable "x" is not equal to zero, processing resumes at function 718 to evaluate another point in the same (e.g., third) quadrant of the search grid.

In function 724, the next point designated by variable "x" and the variable "y" is evaluated and stored. For example, the point is evaluated by programming the FIR filter 250 with the associated values for the pre-cursor and post-cursor taps and determining a signal quality metric the data signal produced using tap values associated with the selected point.

In function 726, the value of variable "x" is incremented and the value of variable "y" is incremented (thus continuing to urge the search function in a generally counter-clockwise direction). In function 728, the value of variable "x" is compared with variable "N." If the value of variable "x" is equal to variable "N," processing proceeds to function 730 where the process exits. If the value of variable "x" is not equal to variable "N," processing resumes at function 724 to evaluate another point in the same (e.g., fourth) quadrant of the search grid.

When process 700 exits at function 730, the stored evaluations are compared to determine the best signal quality metric for the given value of "N" (e.g., distance from the origin). If any of the evaluated points has improved signal quality, the origin to the search grid location is set to the location of the best signal quality metric and the distance "N" is set to one and the process 700 is called again with the new value of "N." If none of the evaluated points has improved signal quality, the value of N is incremented and the process 700 is called again with the new value of "N."

Process 700 can be terminated at any point of the process by (for example) in various ways. For example, the process can be terminated when a pre-defined number of evaluations have been made. Also the process can be terminated when a pre-defined search radius has been reached. Further, the process can be terminated when a time period has been (or is about to be) exceeded.

Thus, process 700 can be called (e.g., instantiated) using a value of one for "N" to search the four nearest neighbor points to an initial point. The process 700 can be subsequently called using a value of two for "N" to search the eight nearest neighbor once-removed points. The process can be called using higher values of "N" as discussed above to provide searches of greater distances when more optimum solutions have not been encountered. For example, a value of four for "N" would produce 16 remote neighbors from which to search for a more optimum solution.

Inverting the order of the increment and decrement operators in functions 708, 714, 720, and 726 and modifying the comparison function of blocks 710, 716, 722, and 728 can be used to implement a search pattern in a clockwise (as compared to a counter-clockwise) direction.

Performing checks of whether an evaluation for a particular point has been evaluated (and stored) can be used to avoid performing the same evaluation twice on a particular point on the search grid (such as could occur when the process is called recursively where a former nearest neighbor point of a previous call is a new initial point of a subsequent call). For example, if a valid signal quality metric exists for a given point, the generation of a signal and evaluation of the signal need not be performed.

Accordingly, the method for searching the search grid as described above can be implemented using functions (e.g., incrementing, decrementing, and comparison) that can be efficiently implemented in hardware. Efficiently implementing the functions in hardware includes using structures that are generally faster, consume less power, and occupy less space than higher order functions.

Figure 8:
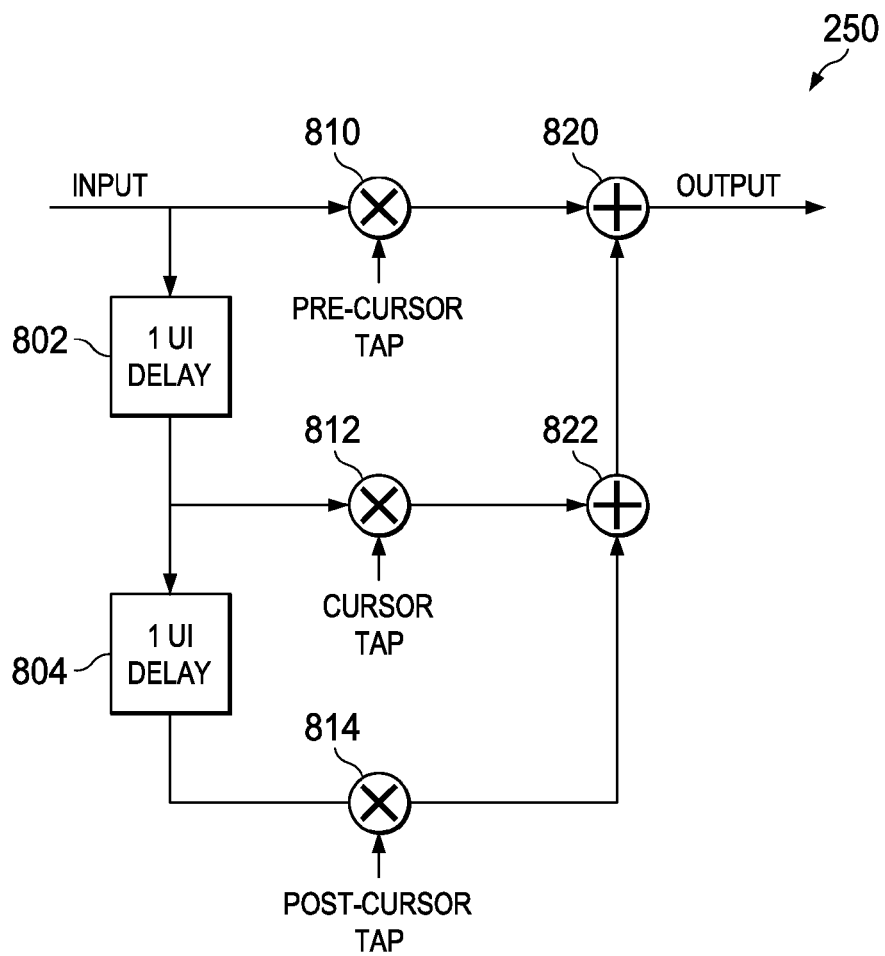
FIG. 8 is a schematic diagram of a finite impulse response filter used for signal compensation in accordance with embodiments of the present disclosure.

FIG. 8 is a schematic diagram of a finite impulse response filter used for signal compensation in accordance with embodiments of the present disclosure. FIR (finite impulse response) filter 250 includes an input node that is coupled to an input node of delay register 802 and an input of mixer 810. Delay register 802 is arranged to provide a unit interval (UI) delay for data provided to the input node. The output of delay register 802 is coupled to an input of delay register 804 and an input of mixer 812. Delay register 804 is arranged to provide a unit interval (UI) delay for data supplied by the output of delay register 802. The output of delay register 804 is coupled to an input of mixer 814.

Mixer 810 is arranged to control the magnitude of the output of mixer 810 in response to a coefficient (such as received from a pre-cursor tap 252). The output of mixer 810 is coupled to a first input of summing node 820. Mixer 812 is arranged to control the magnitude of the output of mixer 812 in response to a coefficient (such as received from a cursor tap 254). The output of mixer 812 is coupled to a first input of summing node 822. Mixer 814 is arranged to control the magnitude of the output of mixer 814 in response to a coefficient (such as received from a post-cursor tap 256). The output of mixer 814 is coupled to a second input of summing node 822.

Summing node 822 is arranged to output the sum of the first and second inputs at an output that is coupled to a second input of summing node 820. Summing node 820 is arranged to output the sum of the first and second inputs at an output that is coupled to the output of FIR filter 250. Thus, pre-cursor, cursor, and post-cursor values are used as coefficients to determine a frequency response (and thus the amount of emphasis) for a data signal that is to be transmitted.

Figure 9:
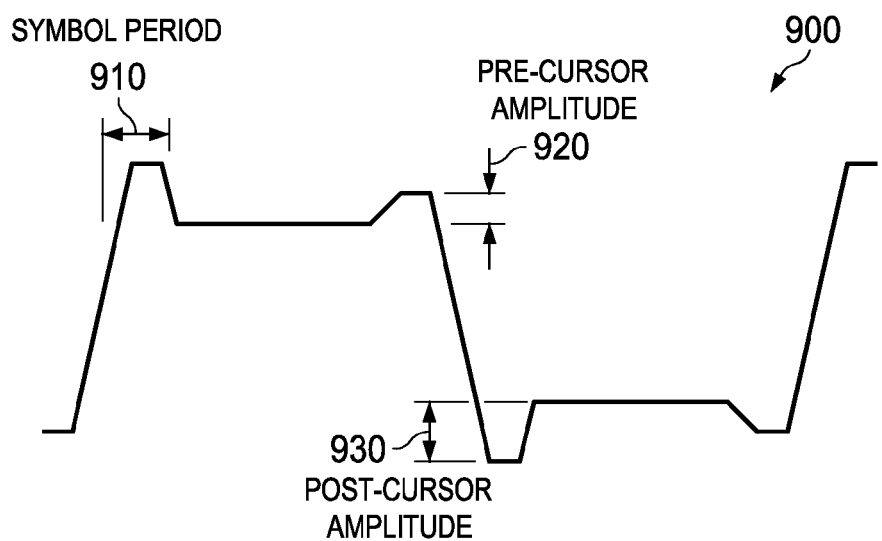
FIG. 9 is a waveform diagram illustrating a waveform of a data signal in accordance with embodiments of the present disclosure.

FIG. 9 is a waveform diagram illustrating a waveform of a data signal in accordance with embodiments of the present disclosure. Waveform 900 demonstrates a sequence of logic ones followed by a sequence of logic zeros. Waveform 900 has a symbol period 910, a pre-cursor amplitude 920, and a post-cursor amplitude 930. Symbol period 910 is length of time reserved for a symbol (and is normally sufficient for the signal to achieve a voltage associated with a steady state after transitioning from a voltage that is half of the peak-to-peak amplitude).

As discussed above, the eye margin can be controlled, for example, by adjusting the pre-cursor tap (e.g., pre-cursor tap 252) and the post-cursor tap (e.g., post-cursor tap 256). Adjusting the settings for the pre-cursor tap primarily controls the height of the transmitter waveform (e.g., pre-cursor amplitude 920) prior to a signal transition. Adjusting the settings for the post-cursor tap primarily controls the height of the transmitter waveform (e.g., pre-cursor amplitude 930) following a signal transition of the waveform 900.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for optimizing transmitter equalization settings, comprising:
    selecting an initial point on a two-dimensional search grid wherein each point on the search grid is associated with a first equalizer setting and a second equalizer setting and is addressable using at least a two-dimensional coordinate system;
    determining an initial eye margin of an initial data signal that is equalized in accordance with the first equalizer setting and the second equalizer setting that are associated with the initial point and that is transmitted across a channel medium;
    selecting adjacent points that are adjacent to the initial point;
    determining an eye margin for each data signal equalized in accordance with the first equalizer setting and the second equalizer setting that are associated with each selected adjacent point to the initial point and that are transmitted across the channel medium; and
    comparing each of the determined eye margins to determine when the eye margin is higher than the initial eye margin, and when the eye margin is higher than the initial eye margin, using coordinates of the point associated with the eye margin which is higher than the initial eye margin to select an optimized first equalizer setting and an optimized equalizer setting for subsequent transmissions of data signals;
    wherein the selecting adjacent points that are adjacent to the initial point includes selecting nearest neighbors having a distance of one as defined by the formula:

$$\text{dist}=|x|+|y|$$

where "dist" is the distance, "x" is an integer coordinate in a first direction for each of the selected adjacent points, and "y" is an integer coordinate in a second direction for each of the selected adjacent points.

2. A method for optimizing transmitter equalization settings, comprising:
    selecting an initial point on a two-dimensional search grid wherein each point on the search grid is associated with a first equalizer setting and a second equalizer setting and is addressable using at least a two-dimensional coordinate system;
    determining an initial eye margin of an initial data signal that is equalized in accordance with the first equalizer setting and the second equalizer setting that are associated with the initial point and that is transmitted across a channel medium;
    selecting adjacent points that are adjacent to the initial point;
    determining an eye margin for each data signal equalized in accordance with the first equalizer setting and the second equalizer setting that are associated with each selected adjacent point to the initial point and that are transmitted across the channel medium; and
    comparing each of the determined eye margins to determine when the eye margin is higher than the initial eye margin, and when the eye margin is higher than the initial eye margin, using coordinates of the point associated with the eye margin which is higher than the initial eye margin to select an optimized first equalizer setting and an optimized equalizer setting for subsequent transmissions of data signals;
    wherein the selected adjacent points that are adjacent to the initial point includes selecting nearest neighbors once-removed having a distance of two as defined by the formula:

$$\text{dist}=|x|+|y|$$

where "dist" is the distance, "x" is an integer coordinate in a first direction for each of the selected adjacent points, and "y" is an integer coordinate in a second direction for each of the selected adjacent points.

3. The method of claim 2, wherein the selected adjacent points that are adjacent to the initial point that includes selecting nearest neighbors once-removed having the distance of two are selected in response to a determination that a determined eye margin does not exist that is higher than the initial eye margin for adjacent points having the distance of one as determined by the formula.

4. A method for optimizing transmitter equalization settings, comprising:
    selecting an initial point on a two-dimensional search grid wherein each point on the search grid is associated with a first equalizer setting and a second equalizer setting and is addressable using at least a two-dimensional coordinate system;
    determining an initial eye margin of an initial data signal that is equalized in accordance with the first equalizer setting and the second equalizer setting that are associated with the initial point and that is transmitted across a channel medium;
    selecting adjacent points that are adjacent to the initial point;

determining an eye margin for each data signal equalized in accordance with the first equalizer setting and the second equalizer setting that are associated with each selected adjacent point to the initial point and that are transmitted across the channel medium; and comparing each of the determined eye margins to determine when the eye margin is higher than the initial eye margin, and when the eye margin is higher than the initial eye margin, using coordinates of the point associated with the eye margin which is higher than the initial eye margin to select an optimized first equalizer setting and an optimized equalizer setting for subsequent transmissions of data signals;

wherein the selecting the initial point is performed in response to estimating transmission characteristics of the channel medium.

5. The method of claim 4, wherein the selecting the initial point is performed in response to a prior evaluation of signals transmitted across the channel medium and equalized using the first and the second settings associated with each neighboring point of a group of neighboring points on the search grid.

6. A method for optimizing transmitter equalization settings, comprising:

selecting an initial point on a two-dimensional search grid wherein each point on the search grid is associated with a first equalizer setting and a second equalizer setting and is addressable using at least a two-dimensional coordinate system;

determining an initial eye margin of an initial data signal that is equalized in accordance with the first equalizer setting and the second equalizer setting that are associated with the initial point and that is transmitted across a channel medium;

selecting adjacent points that are adjacent to the initial point;

determining an eye margin for each data signal equalized in accordance with the first equalizer setting and the second equalizer setting that are associated with each selected adjacent point to the initial point and that are transmitted across the channel medium; and comparing each of the determined eye margins to determine when the eye margin is higher than the initial eye margin, and when the eye margin is higher than the initial eye margin, using coordinates of the point associated with the eye margin which is higher than the initial eye margin to select an optimized first equalizer setting and an optimized equalizer setting for subsequent transmissions of data signals;

further comprising:

using the coordinates of the point having higher eye margin to select a subsequent center point on the two-dimensional search grid;

determining a subsequent center eye margin of a subsequent data signal that is equalized in accordance with subsequent center point and that is transmitted across the channel medium;

selecting adjacent points that are adjacent to the subsequent center point;

determining the eye margin for each data signal equalized in accordance with the first equalizer setting and the second equalizer setting that are associated with each selected adjacent point to the subsequent center point and that are transmitted across the channel medium; and comparing each of the determined signal quality metrics eye margins to determine whether a determined eye margin exists that is higher than the subsequent center eye margin.

7. The method of claim 6 wherein a previously determined eye margin is used as the eye margin for one of the adjacent point to the subsequent center points in response to a determination that the one of the adjacent points to the subsequent center point is also the adjacent point to the initial point.

8. A method for optimizing transmitter equalization settings, comprising:

selecting an initial point on a two-dimensional search grid wherein each point on the search grid is associated with a first equalizer setting and a second equalizer setting and is addressable using at least a two-dimensional coordinate system;

determining an initial eye margin of an initial data signal that is equalized in accordance with the first equalizer setting and the second equalizer setting that are associated with the initial point and that is transmitted across a channel medium;

selecting adjacent points that are adjacent to the initial point;

determining an eye margin for each data signal equalized in accordance with the first equalizer setting and the second equalizer setting that are associated with each selected adjacent point to the initial point and that are transmitted across the channel medium; and comparing each of the determined eye margins to determine when the eye margin is higher than the initial eye margin, and when the eye margin is higher than the initial eye margin, using coordinates of the point associated with the eye margin which is higher than the initial eye margin to select an optimized first equalizer setting and an optimized equalizer setting for subsequent transmissions of data signals;

wherein the eye margins are determined in a generally counter-clockwise direction about the initial point.

9. A method for optimizing transmitter equalization settings, comprising:

selecting an initial point on a two-dimensional search grid wherein each point on the search grid is associated with a first equalizer setting and a second equalizer setting and is addressable using at least a two-dimensional coordinate system;

determining an initial eye margin of an initial data signal that is equalized in accordance with the first equalizer setting and the second equalizer setting that are associated with the initial point and that is transmitted across a channel medium;

selecting adjacent points that are adjacent to the initial point;

determining an eye margin for each data signal equalized in accordance with the first equalizer setting and the second equalizer setting that are associated with each selected adjacent point to the initial point and that are transmitted across the channel medium; and comparing each of the determined eye margins to determine when the eye margin is higher than the initial eye margin, and when the eye margin is higher than the initial eye margin, using coordinates of the point associated with the eye margin which is higher than the initial eye margin to select an optimized first equalizer setting and an optimized equalizer setting for subsequent transmissions of data signals;

wherein the first equalizer setting is a pre-cursor tap setting and the second equalizer setting is a post-cursor tap setting.

10. A method for optimizing transmitter equalization settings, comprising:

selecting an initial point on a two-dimensional search grid wherein each point on the search grid is associated with a first equalizer setting and a second equalizer setting and is addressable using at least a two-dimensional coordinate system;

determining an initial eye margin of an initial data signal that is equalized in accordance with the first equalizer setting and the second equalizer setting that are associated with the initial point and that is transmitted across a channel medium;

selecting adjacent points that are adjacent to the initial point;

determining an eye margin for each data signal equalized in accordance with the first equalizer setting and the second equalizer setting that are associated with each selected adjacent point to the initial point and that are transmitted across the channel medium; and comparing each of the determined eye margins to determine when the eye margin is higher than the initial eye margin, and when the eye margin is higher than the initial eye margin, using coordinates of the point associated with the eye margin which is higher than the initial eye margin to select an optimized first equalizer setting and an optimized equalizer setting for subsequent transmissions of data signals;

wherein a back channel is used to convey an indication of the selected first equalizer setting and the second equalizer setting to the equalizer used to equalize the transmitted signal.

* * * * *